(12) United States Patent
Monnett et al.

(10) Patent No.: US 10,990,760 B1
(45) Date of Patent: Apr. 27, 2021

(54) AUTOMATIC DETERMINATION OF CUSTOMER SENTIMENT FROM COMMUNICATIONS USING CONTEXTUAL FACTORS

(71) Applicant: SupportLogic, Inc., San Jose, CA (US)

(72) Inventors: Charles C. Monnett, San Jose, CA (US); Lawrence Spracklen, San Jose, CA (US); Krishna Raj Raja, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 73 days.

(21) Appl. No.: 16/352,692

(22) Filed: Mar. 13, 2019

Related U.S. Application Data

(60) Provisional application No. 62/642,463, filed on Mar. 13, 2018.

(51) Int. Cl.
  *G06F 40/30* (2020.01)
  *G06F 40/211* (2020.01)
  *G06F 40/295* (2020.01)

(52) U.S. Cl.
  CPC ............ *G06F 40/30* (2020.01); *G06F 40/211* (2020.01); *G06F 40/295* (2020.01)

(58) Field of Classification Search
  CPC .................. G06F 40/00–58; G06F 16/3344
  USPC .......................... 704/1, 9, 10, 257, 270–275
  See application file for complete search history.

(56) References Cited

U.S. PATENT DOCUMENTS

| | | |
|---|---|---|
| 6,832,205 B1 | 12/2004 | Aragones et al. |
| 9,000,934 B1 | 4/2015 | Gordin et al. |
| 9,473,637 B1 * | 10/2016 | Venkatapathy ... G06F 16/90332 |
| 9,678,817 B1 | 6/2017 | Hasbun Pacheco et al. |
| 2003/0046250 A1 | 3/2003 | Kuettner et al. |
| 2010/0198635 A1 | 8/2010 | Pirtle et al. |
| 2012/0143564 A1 | 6/2012 | Li et al. |
| 2013/0268262 A1 * | 10/2013 | Moilanen ................ G06F 40/30 704/9 |

(Continued)

OTHER PUBLICATIONS

Office Action dated Mar. 1, 2021, from related U.S. Appl. No. 16/352,638.

*Primary Examiner* — Jesse S Pullias
(74) *Attorney, Agent, or Firm* — Dergosits & Noah LLP; Todd A. Noah

(57) ABSTRACT

Systems and methods are described for determining customer sentiment using natural language processing in technical support communications. Communication content exchanged between a customer device and an agent device may be filtered to remove technical support syntax. Using natural language processing techniques, the processor may assign baseline values to features within the filtered communication content. To assign the baseline values, features from the filtered communication content may be identified, where the features pertain to expressed sentiments, and a trained first model may be applied to identify polarities and strengths related to the identified features. A score value may then be assigned to each identified feature, the score values being based on the polarities and strengths. A subset of the score values may then be weighted based on metadata and/or context, and the score values may be combined using a second model to determine an overall sentiment of the filtered communication content.

20 Claims, 12 Drawing Sheets

(56) References Cited

U.S. PATENT DOCUMENTS

| | | | |
|---|---|---|---|
| 2014/0188457 A1* | 7/2014 | Fink | G06F 40/30 |
| | | | 704/9 |
| 2014/0245075 A1* | 8/2014 | Dhoolia | G06F 11/3466 |
| | | | 714/45 |
| 2015/0254687 A1 | 9/2015 | Konopka et al. | |
| 2015/0254689 A1 | 9/2015 | Amemiya | |
| 2016/0098480 A1* | 4/2016 | Nowson | G06F 40/30 |
| | | | 707/738 |
| 2017/0242919 A1* | 8/2017 | Chandramouli | G06F 16/3344 |
| 2018/0131559 A1* | 5/2018 | Tapia | H04L 41/5009 |
| 2018/0276061 A1 | 9/2018 | An et al. | |
| 2019/0213605 A1 | 7/2019 | Patel et al. | |
| 2020/0004434 A1 | 1/2020 | Borlick et al. | |

* cited by examiner

US 10,990,760 B1

AUTOMATIC DETERMINATION OF CUSTOMER SENTIMENT FROM COMMUNICATIONS USING CONTEXTUAL FACTORS

RELATED APPLICATIONS

This application claims the benefit of U.S. Provisional Patent Application No. 62/642,463 for "METHOD TO CALCULATE SENTIMENT SCORE," filed Mar. 13, 2018, the contents of which are incorporated by reference in its entirety.

FIELD OF THE PRESENT DISCLOSURE

The present disclosure generally relates to parsing and analysis of electronic communications to identify customer sentiment.

SUMMARY

Systems and methods are described for processing electronic communications to determine sentiment using natural language processing in technical support contexts, where conventional methodologies have unique challenges. A processor of a computer having memory, such as a computing device used by a support agent, may receive communication content exchanged between a customer device and an agent device, where the communication content includes inbound communication to the agent device. The processor may filter the received communication content to remove predetermined technical support syntax. Using natural language processing techniques, the processor may then assign baseline values to features within the filtered communication content. To assign the baseline values, the processor may first identify features from the filtered communication content, where the features pertain to expressed sentiments in the filtered communication content. Entity detection may then be performed to classify each identified feature as relating to one of a support experience and a business experience. For the identified support experience features, a trained first model may be applied to identify polarities and strengths related to the identified features. The first model may be previously trained to identify customer sentiments in the customer technical support context. A score value may then be assigned to each identified support experience feature, the score values being based on the polarities and strengths identified for each identified support experience feature.

A subset of the score values may then be weighted based on metadata associated with the filtered communication content. Finally, the score values may be combined using a second model to determine an overall sentiment of the filtered communication content. The overall sentiment may be subsequently used to update a case sentiment (for a plurality of communications between the customer device and the agent device), a customer sentiment, and/or an agent sentiment. In further embodiments, outbound communications from the agent may also be evaluated using a separate model from the first model, and the overall sentiment may be updated using these further evaluations. Also, context data may be advantageously utilized to enhance the processing of identified features and/or weighting of the score values in the determination of the overall sentiment.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

Figure 1:
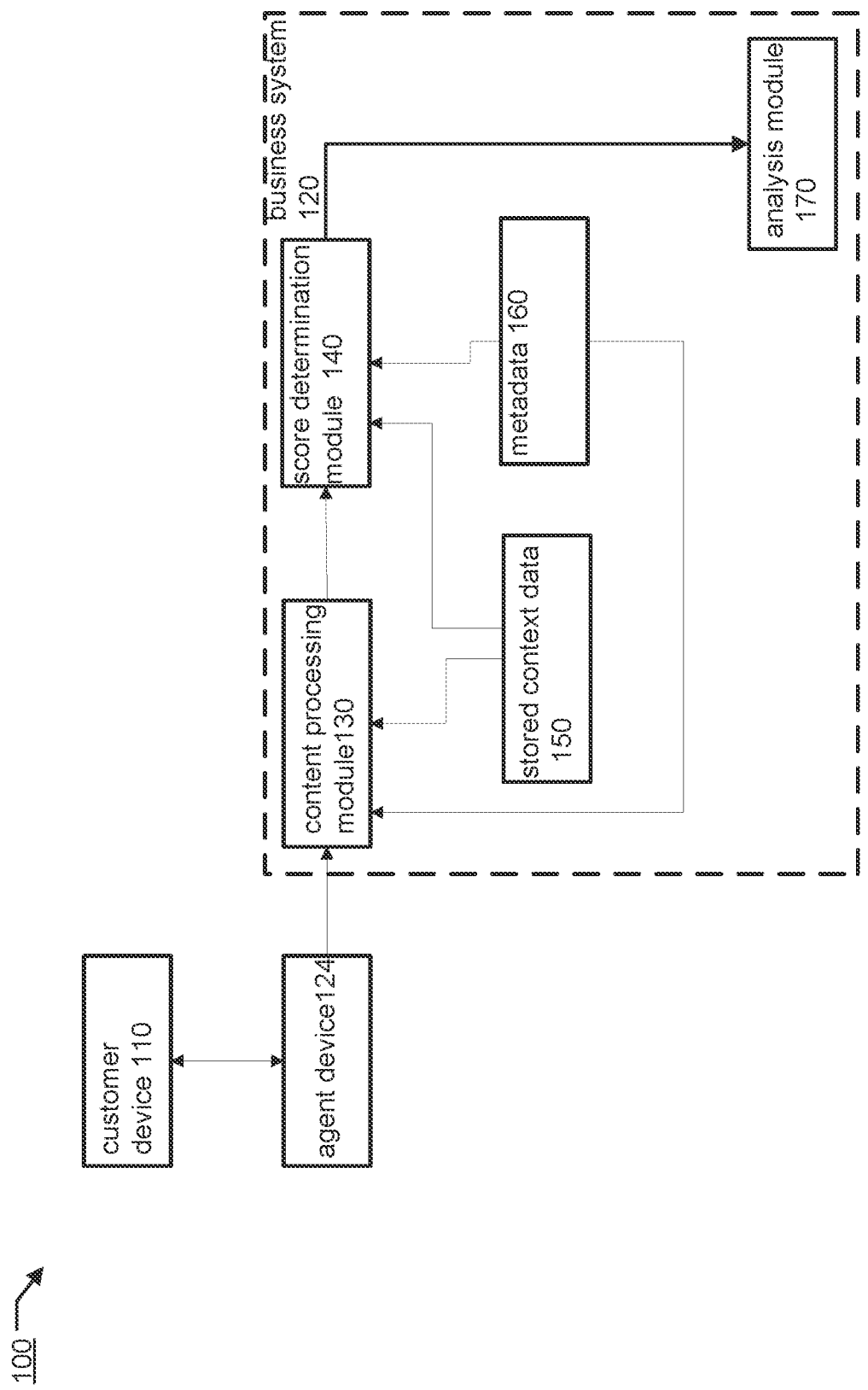
FIG. 1 shows a simplified flow diagram of a specific embodiment for a system for determining sentiment using natural language processing in technical support communications.

Understanding customer sentiment is valuable to businesses; customer happiness results in loyal, repeat customers, whereas customer unhappiness is a leading reason for driving customers to competitors. Customers interact with businesses in a variety of ways, and each of these channels of interaction has its own associated sentiment. For instance, the buying experience, the product experience, and the experience interacting with the company support team when help is required are all examples of such channels of interaction. To improve customer interactions, businesses may ask customers about their experience and monitor their responses. This monitoring conventionally takes the form of a "please complete this survey" pop-up when browsing a company website, or a disclaimer such as "this call may be recorded for training purposes" when calling a customer support line.

The present application describes an approach to transparently provide accurate customer sentiment metrics that can be leveraged to drive actionable improvements. As discussed above, there are many channels of customer/company interaction, all with their own associated sentiments. While the approach described herein is described with reference to a customer's technical support interactions with a business, which may provide products or services to its customers, the approach is also more generally applicable to other problem-solving technology-based communications (e.g., information technology and/or engineering ticketing systems, etc.). This space is inherently different from typical consumer support, and presents its own unique challenges, preventing conventional technology-based consumer support solutions from being effectively leveraged in this space.

As discussed above, a primary technique employed by companies to better understand the sentiment of their customers is via customer surveys. However, customer surveys are an unreliable method of determining how a customer feels about interactions with a company. A response rate of 1-in-8 is within expectations and, if the survey and its questions are not structured and worded properly, there is the possibility of introducing bias into customer responses. Also, these surveys, by their nature, must be done after-the-fact and are often performed on a quarterly or annual basis. Surveys may also be viewed by customers as intrusive and as an annoyance while interacting with the business. Similarly, some customer relationship management platforms may provide smiley face emojis (or similar) at the bottom of emails for users to provide sentiment feedback. However, just like surveys, this technique suffers from poor response rates, and doesn't provide granular information as to whether the customer is upset with support or with the product (and vice versa, customer is happy with support or product).

A technology-based approach to address the shortcomings of conventional after-the-fact monitoring of customer sentiment is to attempt to automatically determine sentiment from customer interactions without the need to request feedback from the customer. Such automated sentiment techniques may analyze communications, such as emails and social media posts on a feed associated with the business. Tools have also been developed to leverage a variety of machine learning ("ML") algorithms to automatically determine the sentiment associated with text communications. Unfortunately, while these existing techniques may effectively extract sentiment from informal conversations, such as social media posts, automated ML processing generally performs poorly when applied to formal interactions in the technical support domain.

To address the shortcomings of conventional automatic sentiment determination techniques, methods and systems are described that determine an overall sentiment associated for the satisfaction, happiness, and/or sentiment of a business's customers directly from interactions between a business and its customers. This overall sentiment may take the form of a numerical value (henceforth called "Sentiment Score"). This score may be automatically determined by applying machine learning methods to all of the customer-company interactions associated with each support case, and is updated in real-time as cases evolve over time. Additionally, the score can be computed periodically, at specified intervals, or even run across all historical tickets in a customer's CRM, thereby allowing the historical sentiment trends to be computed. The overall sentiment may be derived from domain- and/or channel-specific language models that identify and differentiate between true positive or negative language. These models may also identify and differentiate between different aspects of sentiment, sometimes independently and sometimes with interactions between one another. Furthermore, these models may make these predictions on individual instances of communication or aggregate multiple instances in one stream to make contextualized predictions. These individual contextualized predictions may then be combined into a single numerical value that contributes to Sentiment Score, as discussed in later sections. Sentiment Score can be computed and tracked at a per-case level or aggregated to track sentiment across multiple dimensions: per-customer, per-company, per-product, and per-agent; each of these implementations are described below.

Finally, both the calculated Sentiment Scores and the individual detected instances of sentiment (in any aspect) may be presented to a user on a graphic interface together or separately to maximize the utility of the product in which they are incorporated. For example, sentiment scores alongside the exact snippets of text that had the greatest effect on the calculation of that score, including highlighting of those sentiment snippets within the body of the communication from which they originated, may be useful to identify language to use or avoid. Highlighting the most interesting pieces of text within the full support case view allows support agents or managers to build an understanding of case context quickly by skimming through the case with an additional emphasis on understanding the highlighted sections. A summarized case view may also be provided by presenting only the snippets of text deemed most interesting. This wholly summarized view may allow for rapid understanding of the case context in terms of customer, product, agent, etc., experiences so that individuals throughout a business can act on that information in the most efficient means possible with or without a full understanding of the technical content therein. Additionally, the calculated sentiment scores may be provided by an API, or sent to a customer's system of record (generally a CRM).

FIG. 1 shows a simplified flow diagram of a specific embodiment for a system 100 for determining sentiment using natural language processing in technical support communications. System 100 may be used to detect sentiment of communications sent between customer device 110, the agent device 124, and the business system 120, which may include one or more computing devices or servers. The customer device 110, the agent device 124, and the business system 120 may be communicatively coupled to each over via a network connection (i.e. using a local network or a remote network, such as the Internet). Business system 120 may perform sentiment determining and monitoring of communications between the customer device 110 and agent device 124 using content processing module 130 and score determination module 140, whose functionality are detailed in greater detail below. To improve the interpretation of features during the content processing and the score determination, both content processing module 130 and score determination module 140 may utilize one or both of stored context data 150 and metadata 160. Finally, sentiment from individual communications, determined by score determination module 140, may be utilized by analysis module 170 to update sentiment metrics for various entities over a longer period of time.

The overall sentiment of a communication, also referred to herein as sentiment score, may be determined directly from the communication between two (or more) parties or business entities. While conversations can just be between a customer and a support agent, there may also be original equipment manufacturers (OEMs), partners and integrators involved in the ticket, and both the customer device and the agent device may be associated with multiple individuals. This communication forms the broad basis for information used in the sentiment score determination, from which three primary classes of factors may be used as both independent and dependent input factors in the methodology:

Content: the actual information (typically written language) exchange between the customer and the business. This content could be communicated via e-mail, live web chats through a client like Slack (marketed by Slack Technologies, of San Francisco, Calif.), instant messages, a CRM webform, or a variety of different textual communication mediums. Sentiment score can also be derived from voice communications using readily-available voice-to-text applications to automatically transcribe audio data (i.e. from a mobile telephone, video conferencing, or in-app voice conversation) into written language.

Metadata: metadata includes of information about, associated with, or derived from the communication exchange itself, including;

Entities participating in the communication (from whom, to whom);

Timing of the communication; and

A difference between comment times;

Context: contextual information consists of any additional pertinent information that is available about the communicating parties (customer, company, agent, etc.) and may be derived from a wide variety of sources, including:

Information about the size of the customer account;

Information about when a contract with the customer needs to be renewed; and

Information about historical interactions with the customer, company and agent.

Each of these components may be taken into consideration when computing sentiment score, as described in detail below. Every time new content is generated in a customer support interaction, the sentiment scoring process may be invoked, which may analyze the new content, generating a score for the new content and update any dependent scores appropriately. In other embodiments, the sentiment scoring process may be invoked in response to a periodic interval of time (in the absence of new communication), or other predetermined events.

Figure 2:
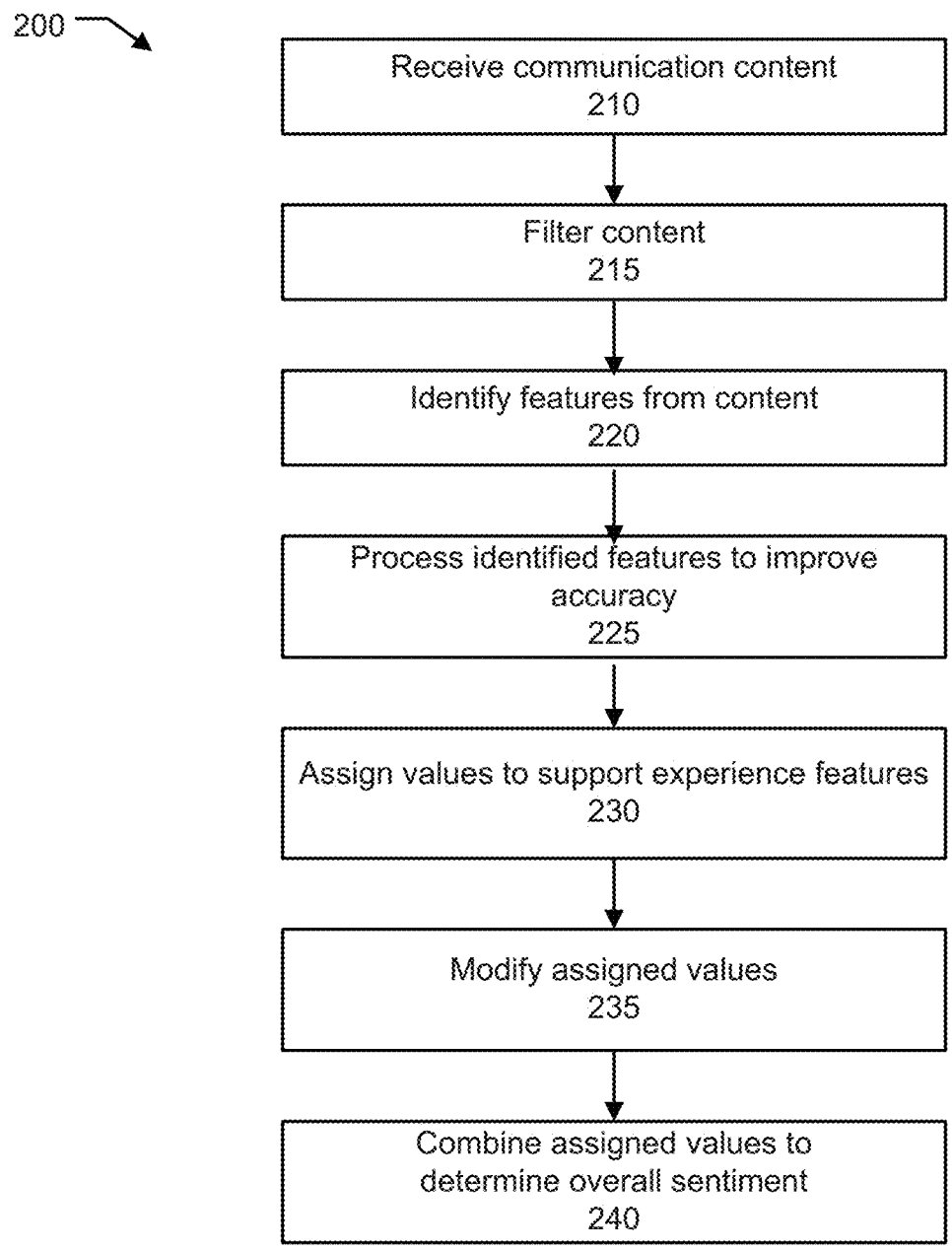
FIG. 2 shows a specific embodiment of a flow diagram for a method of determining sentiment using natural language processing in technical support communications.

FIG. 2 shows a specific embodiment of a flow diagram for a method 200 of determining sentiment using natural language processing in technical support communications. A processor of a computer having memory, such as a computing device used by a support agent, may receive communication content exchanged between a customer device and an agent device at step 210. The communication content may include inbound communication to the agent device, outbound communication to the customer device, or both.

The processor may filter the received communication content to remove predetermined technical support syntax at step 215. To achieve accurate analysis and scoring of the communication content, intelligent preprocessing may be performed at step 215 to ensure that irrelevant content may be removed. The preprocessing may include removing predetermined language, such as e-mail headers, footers, and signature information and repeated e-mail body content that is included by default when a user replies to a previous email (to avoid double-counting of events). The preprocessing may also identify and remove log messages, code and error fragments and other machine data which may interfere or conflict with the natural language used by a human being. Furthermore, technical jargon commonly used in technical support communication that may have negative connotations in day to day language may be removed (e.g. the terms "failed," "failure" etc. may refer to error messages output by a computer, not a failure of the support experience or of a particular product or service). Also, in some embodiments salutations and politeness used in formal conversations (such as thank you, good morning, best regards etc.) may also be removed.

Using natural language processing techniques, the processor may identify features from the filtered communication content at step 220, where the features pertain to expressed sentiments in the filtered communication content. Once the cleansed content is available, the machine learning natural language processing ("NLP") models can then be used to make predictions about multiple dimensions of sentiment in the communication, including a positive-to-negative axis. This process normally involves first applying classic NLP techniques to the communication content. These techniques include tokenization, n-gram creation, TF-IDF, or one-hot encoding. The features generated by these NLP techniques then become inputs to the ML models for optimization described below.

The identified features may then be processed to improve accuracy for the technical support context at step 225. This processing may include applying entity detection to classify each identified feature as relating to one of a support experience and a business experience, and applying a trained first model to each support experience identified feature to identify polarities and strengths related to the identified features. The first model may be previously trained to identify customer sentiments in the customer technical support context. In some embodiments, there may be three groups of models within the NLP process.

With regard to entity detection, the first model may identify and differentiate between sentiment associated with their support experience and their product (or service) experience. Using conventional language-based sentiment models may be difficult in this context because of the highly asymmetric nature of the customer's sentiment towards the product and support, often simultaneously. This may be done using prior knowledge of both support environment-specific language and product-specific language and developing a software system designed to specifically detect each type independently. This can be achieved by using entity detection to determine if the customer is talking about support or about the product and attribute the sentiment accordingly. An exemplary NLP process may use dependency parsing to determine related language within sentences containing sentiments in order to determine the subject of the expressed customer sentiment. For example, if an expressed sentiment is determined to describe a known customer product using linguistic features, the sentiment will be associated with that product as opposed to support. Other certain types of features may clearly be identified using predetermined categories as being related to the support experience (and not a product, service, or agent). These predetermined categories may include "helpful/not helpful" sentiments, "problem solved/problem not solved/ongoing issue," "lack of progress" (i.e. the customer is unhappy with the progress of the ticket thus far), "customer waiting," "good information," and "fast response." It should be noted that while product sentiment is separated from support sentiment in method 200, once this product information has been identified and separated, there are typically product organizations within a business that could readily leverage this information to better understand the both the successes and shortcomings of the company's products, as described below.

A wide variety of different ML algorithms can be effectively deployed to make sentiment predictions. However, the models used in method 200 may be tuned to the support space, and take into consideration the various challenges and factors unique to support language processing. For example, the first model may identify and differentiate between true positive or negative language, problem descriptions, routine pleasantries (e.g., "Have a nice day!"), taking into consideration the typically formal language used in technical support conversations. The first model may also identify and differentiate between multiple aspects of sentiment within these broader categories. For example, if a customer is unhappy with their support experience, is it because they have waited a long time for a response or because they have received multiple erroneous 'fixes' for their problem? This may be achieved with a combination of domain-specific lexicon, grammatical and syntactical analysis e.g., to provide clues as to whether a customer is talking about the past, present, or future, and a multitude of independent models developed specifically to identify particular aspects of sentiment (e.g., politeness/civility) within a support context. The outputs of these models are also combined in a proprietary manner in order to make determinations about higher-level aspects or expressions of sentiment.

In an exemplary embodiment, an attentional model that is language-aware may be used as the first model. 'Attentional' refers to the fact that the model 'attends to' or keys in on particular phrases or words that have been deemed most relevant to desired output (which is the right sentiment class). Building an attentional model with acceptable performance entails it being language-aware in the sense that, relevant parts of the rest of the sentence that are related to the key phrase(s) are located by the attentional model. Regarding the two following examples:

"Your product has been great so far, but support has been very disappointing."

"Your support has been great, but the product has been very disappointing."

Example Sentences A

The attentional model may attend to 'disappointing' by giving far more weight to its presence and meaning than almost anything else in the sentence. This differs from conventional NLP models like a "bag of words" model that will assign a sentiment value to each word (or 'token') but use equal weights across all tokens. The attentional model may assign value to tokens and/or phrases but also assigns uneven weights to those values.

There are several ways in which a dependency parse may be used in the above examples. A first example is that modifiers (like 'really', 'very', 'extremely', or even 'kind of', 'a little' etc.,) may be used to help determine the strength of a sentiment. For example, "a little disappointing", "disappointing", and "very disappointing" may all be graded separately in the exemplary attentional model. However, these modifiers may only apply to the attended phrase—so "very"s that modify words outside of it will not affect its grade. A second example is that what the key phrase applies to or modifies itself may affect its strength. In both above examples, the model may focus on two things: who is being disappointed and what they are disappointed about. Who is disappointed may be implicit given the structure of the language, and may be inferred from the direction of the comment—in both cases, inbound (per metadata associated with the content). The attentional model may implicitly assume that the author of this comment is the one who is disappointed, and they are a customer (because it is inbound) so the model may proceed with scoring the sentiment. This is true of both examples in the previous paragraph. Secondly, what are they disappointed about? In the first example sentence above, the dependency parse may be used to discover that the object that 'is' (at least, perceived to be) "very disappointing" is "support". A corpus of target phrases deemed relevant to support feedback such as "support", "service", "response", "responsiveness", "answer", etc., may belong to a predetermined lexicon of words and/or phrases used to identify sentiments within features of the communication content. Using such a corpus, in an exemplary embodiment, all of the following phrases would be identified as relevant to support feedback:

" . . . but support has been very disappointing."

" . . . but your product has been very disappointing."

" . . . but your responsiveness so far has been very disappointing."

" . . . but the answers we've received have been very disappointing."

Example Sentences B

The pool of relevant terms may be compared to the syntactic siblings of the attended phrase to determine which class to assign the sentiment (which could be no class at all). The four examples of Example Sentences B would all be classified as Very Negative support feedback. However, in the second sentence of Example Sentences A, because the attended phrase does not apply to a support experience, it would not be given any support sentiment at all. That said, because the second sentence of Example Sentences A does apply to a term in a product corpus (which may be generated using a similar set to the above-described support lexicon, but seeded with product names on a per-customer basis), the second sentence may be labeled as Negative Feedback, which may be reserved for negative product feedback or sentiment. Differentiating between these two classes is very relevant for determining and thus scoring the customer experience and/or relationship with the supporting business.

The first model may also, in determining strength and polarity of a feature, utilize known regional and cultural differences when determining the strength of the sentiments. For instance, a slightly negative sentiment from a British or Japanese customer may indicate a much greater level of displeasure than a similar statement from an American or Australian customer due to those cultures' relative level of general expressiveness. This can be achieved using available contextual information e.g. where is the agent or customer located.

Figure 3A:
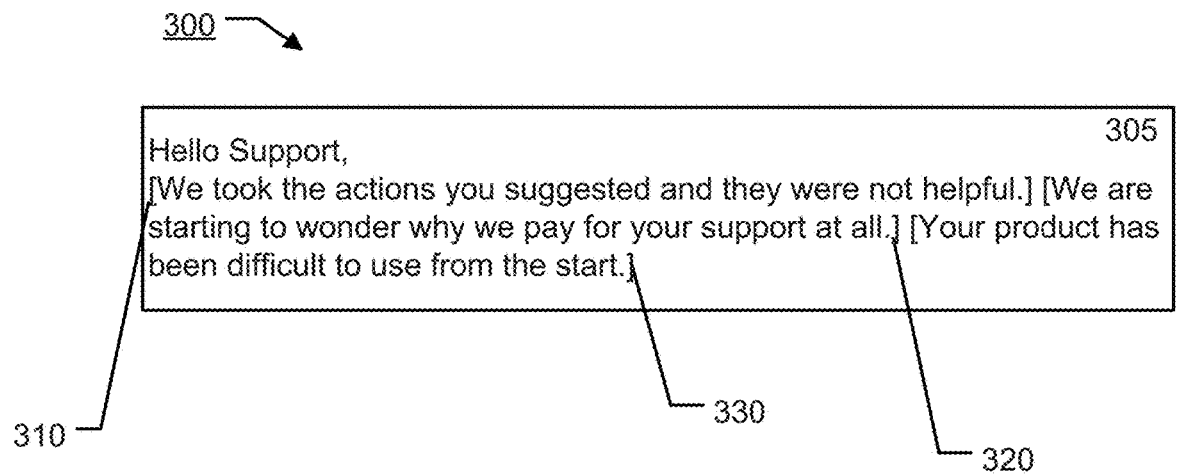
FIGS. 3A-B show how a first model is applied to identify and score features identified from exemplary technical support communications.
Figure 3B:
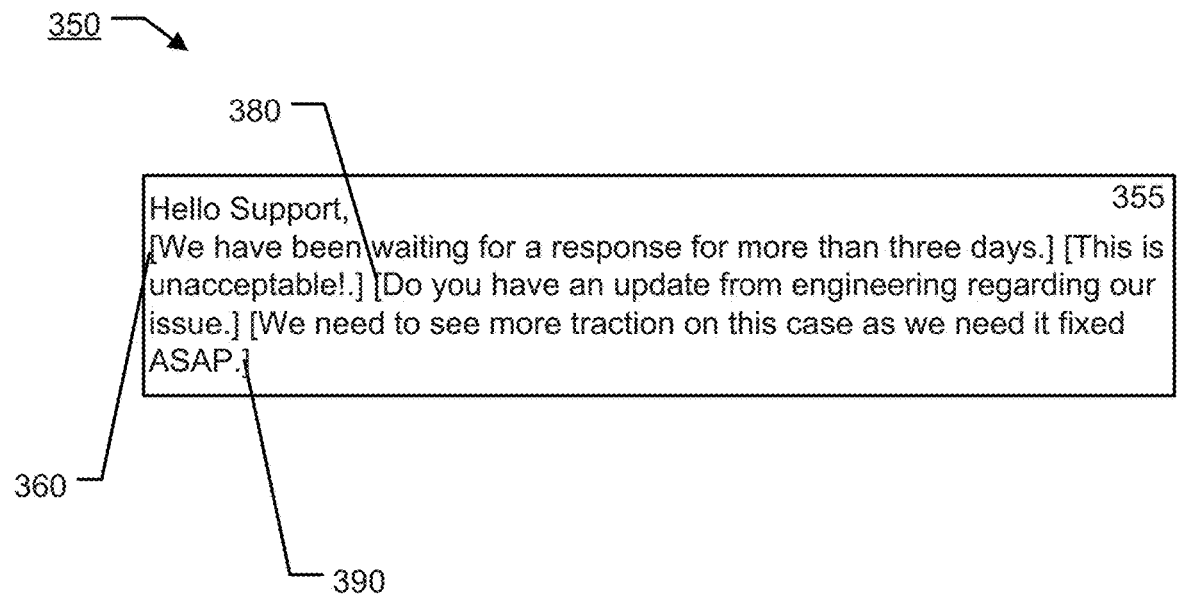

After the processing, the processor may assign a score value to each identified support experience feature at step 230. The score values may be based on the polarities and strengths identified for each support experience identified feature. FIGS. 3A-B show how the first model is applied to identify and score features identified from exemplary technical support communications 300 and 350. For example, the beginning of inbound message 305 includes a sentiment specific to the technical support context in the first sentence 310. The customer has indicated that what support has told them to do has not helped them to resolve their issue. This type of sentiment is specific to the support context, as the language isn't very emotional, but resolving a customer's issue quickly is paramount in the technical support context. In technical support, trying a solution that doesn't necessarily work right away is common. As a result, though the polarity is negative, the strength may be low, and therefore the baseline score would not be exceedingly negative the first-time language like this is detected. However, the first model may decrease the score more each time the customer indicates a solution does not work (up to a limit to prevent runaway scores) in a communication, as a reflection of customer frustration and, potentially, that the support agent may be lacking the technical expertise to understand and/or diagnose the issue. For each sentiment that an attempted solution does not work that is identified in a communication, the first model contributes point values of −2, −4, −6, and −8 points each time (for a maximum of −20 points after four "Not Helpful" designations) in an exemplary scoring system. While the scores described herein are based on a 100-point maximum scale, any suitable scaling system may be used.

Figure 4:
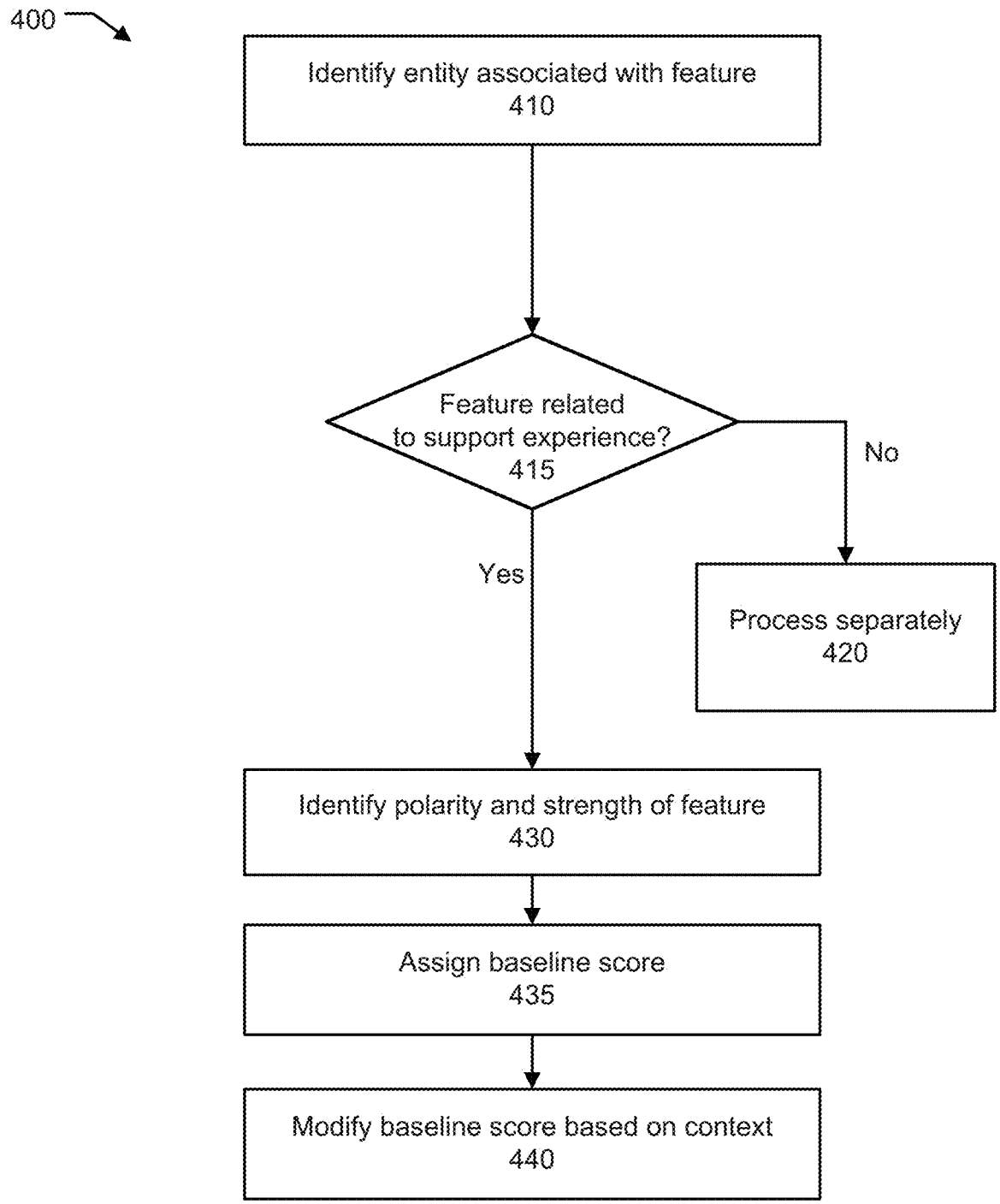
FIG. 4 shows a specific embodiment of a flow diagram for a method of identifying and scoring features identified from technical support communications.

The second sentence 320 and third sentence 330 are relatively straightforward negative support sentiment and negative product sentiments respectively. In some embodiments, support sentiments and business sentiments (such as a product sentiment) are handled differently, as it would be undesirable to allow negative business sentiments to affect a sentiment score of the technical support being provided. FIG. 4 shows a specific embodiment of a flow diagram for a method 400 of identifying and scoring features identified from technical support communications. At step 410, entity detection may be used to identify an entity associated with a feature from the communication content. Entities may include the technical support provided by the agent and an aspect of the business, such as a product or a service offered by the business. Any suitable entity detection algorithm may be used by the first model at step 410 (such as, for example, conditional random field (CRF) algorithms).

Method 400 seeks to assign scores to features including sentiments related to the support experience. At step 415, features not related to the support experience (such as a sentiment associated with a product or service) are isolated from those related to the support experience and are processed separately at step 420. At step 430, the polarity and strength of the identified support experience feature are identified, and at step 435, the baseline score may be assigned. To assign the polarities and strength, the first model has been previously trained to determine the strengths of target phrases within its lexicon. Typically, this training may be done using a labeled predetermined corpus of text. After training, the first model may be capable of generalizing beyond the explicit examples in the training corpus, within a reasonable bound of confidence in those generalized predictions. In FIG. 3A, for example, the second sentence 320 would be classified as having a negative polarity, and having a high strength. The first model would make such determinations, for example, based on text within the negatively labeled corpus indicating during training that phrasing or language used in the manner of second sentence 320 tends to be of the negative variety. Because of these determinations, the baseline score assigned to the feature in sentence 320 would be a large negative value (e.g., −20 points). The baseline score may be adapted based on the context at step 440. For example, the value associated with a high negative sentiment may also vary depending on where the overall sentiment score is at the time that sentiment is detected (e.g. the first model may cause the baseline value to be reduced if there are already significant negative sentiments in the communication).

The third sentence 330, by contrast, despite having a significant negative polarity and strength, would not affect the overall sentiment much because sentence 330 is directed to the product entity, and the overall sentiment is usually presented in a support context. The feature in sentence 330 may resurface at the account or customer level to let individuals interested in account dynamics know that this relationship is threatened.

FIG. 3B includes a message 355 that includes features in sentence 360 regarding a wait time. A complicated part of the scoring pertains to determining whether a customer is upset about waiting on something for support. This relies on several types of language being detected by the core NLP including Out of Office, Customer Waiting (first sentence 360), Follow-up Request (third sentence 380), Frustration, Lack of Progress (fourth sentence 390), Urgency (also fourth sentence 390) and Fast Response. When a feature references a temporal aspect, the time that elapses between incoming messages and outbound responses may be examined by the first model. The true response times—that is, the time between the first outbound message and the first inbound message after the most recent outbound message—may be determined. This accounts for times when a customer may send multiple messages asking for a response—using the time since the most recent inbound message would under represent the time the customer has been waiting for a response. The same process may be used for inbound response times relative to the outbound response times to account for low-priority scenarios where both parties understand that urgent or immediate responses are not necessary. Wait times may impact how a polarity and strength of a feature are assessed during the baseline score determination. As discussed below, wait times may also affect modification of the baseline scores as relevant context data.

Figure 5:
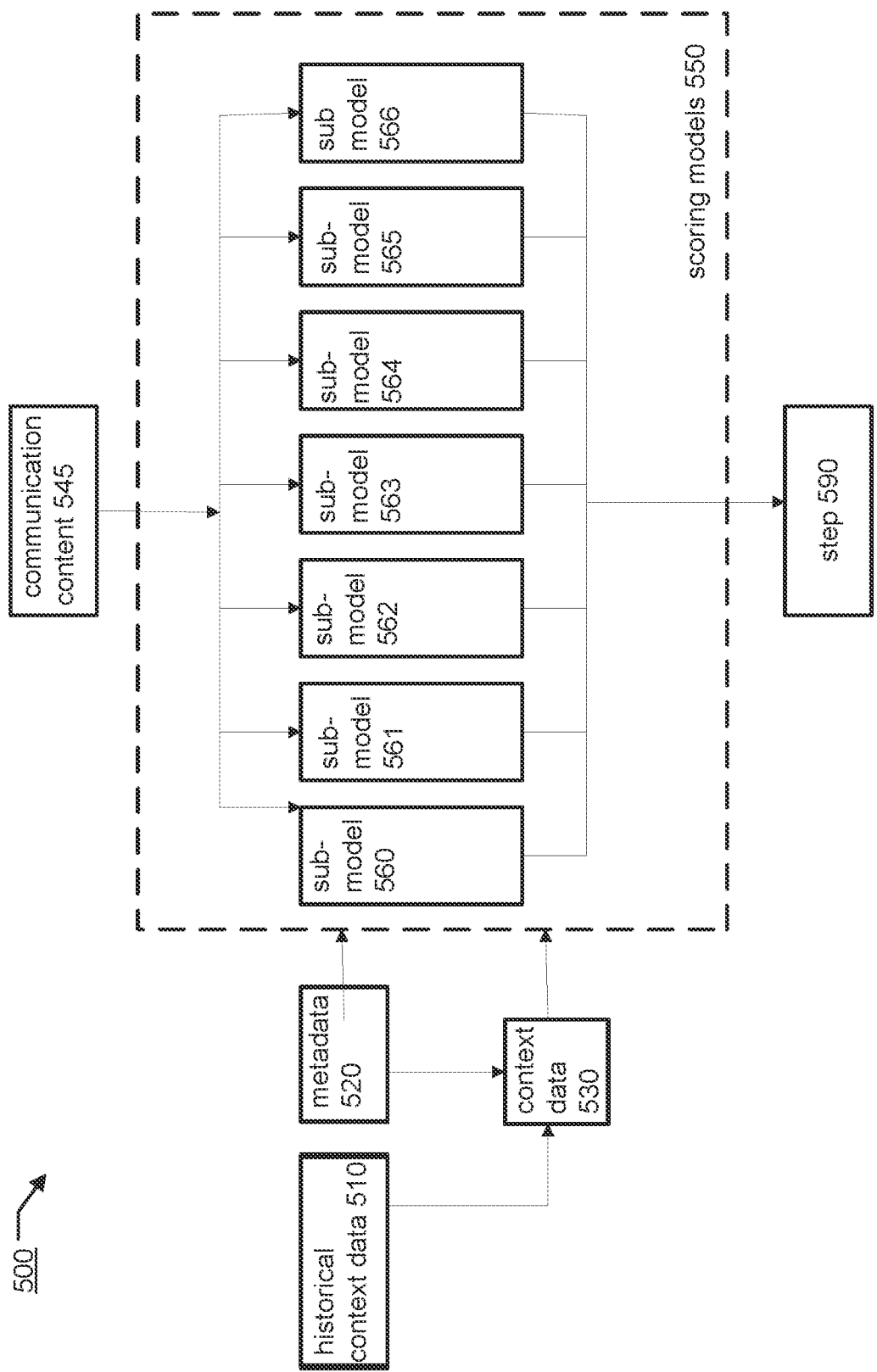
FIG. 5 shows a block diagram of a specific embodiment a system for generating an overall sentiment based on NLP processing of communications based on individual sentiment score models.

Returning to method 200 of FIG. 2, a subset of the score values may be weighted based on metadata associated with the filtered communication content, thereby modifying the assigned values for the subset at step 235. This process is illustrated in FIG. 5, which shows a block diagram of a specific embodiment of a system 500 for generating a overall sentiment based on NLP processing of communications based on individual sentiment score models. Identified features from the communication content 545 (e.g. those identified in step 225 of method 200) may be received by the scoring models 550, which determine sub-scores based on the identified features. Scoring models 550 may include sub-models 560-566, each of which may receive metadata 520 and context data 530 (which may include historical context data 510) to attenuate the baseline scores associated with the identified features. At step 590 the scores may be combined by the second model using weighted combinations, as described below.

The process illustrated in block diagram 500 is performed by multiple unique scoring models 560-566 in parallel, the output from which is combined into an overall sentiment. Second model 590 represents a weighted combination of the inputs from individual sentiment scoring models 560 through 566 (each exhibiting a unique embodiment of model 505), using predetermined weights which may be set, for example, through data analysis and consultation with support professionals. The high number of models in the system 500 may be explained by the fact that, in some embodiments, each type of sentiment calculation may be considered a model. Example embodiments of models 560-566 include an embodiment that calculates sentiment score penalties for outstanding or recent wait times, an embodiment that calculates penalties for cumulative wait times, as well as an embodiment that calculates sentiment score calculations due to the politeness of the responding support agent.

For example, the wait time calculations may be performed by two separate scoring models: one that calculates sentiment score penalties for outstanding wait times and one that calculates penalties for cumulative wait times. After response times have been determined, historical analysis may be performed on the response times (generated using the same calculations as above) to determine distributions of historical response times. Distributions account for case priority (assuming response times will predictably differ between high- and low-priority issues) and case age. Case age is accounted for under the assumption that the acceptable range of response times differs between cases that have been recently opened and those that have been open for a long time. When cases are young, it is important that support is responsive, so that human readers able to understand the nature of the issue and/or the customer relationship are assigned to the case. Without such responsiveness, support may be lackadaisical responding to major issues that went unnoticed, resulting in poor support quality and a negative customer experience. It also sets a good first impression for customers.

On the other end of the distribution, cases that have been open for a long time tend to be either extremely complex and/or require product changes. As a result, response times may be longer as technical analysis is more thorough than usual. In cases where a product change is required, the customer and support may agree to leave the issue open until the updated product has released. This may involve waiting weeks or months, and because these timelines are usually agreed upon, Sentiment Score should not be penalized for these wait times, because it does not reflect negativity in the customer experience. In review, historical analysis of the wait times may be used to determine where in the distribution of historical responses this response time falls in order to determine the appropriate 'penalty' for making the customer wait.

Wait time penalties are determined by where the response time falls in the distribution of historical response times in similar situations. Responses at the very low end of the distribution (<10th, <25th percentiles) are rewarded with Sentiment Score increases, for example +3 and +1 point respectively. Response times are the far end of the distribution (>75th, >90th, >95th percentiles) result in Sentiment Score decreases, for example −1, −3, and −5 points respectively. However, additional signals extracted from core NLP may be used to modify these penalties. For example, when Out of Office messages are detected wait time penalties and rewards are nullified. Penalties are also increased when they follow Follow-up Requests, Urgency, Frustration, and/or Customer Waiting sentiments which indicate that the customer does not feel that support is meeting their needs for this issue. The penalty increases vary from 1.25× for Follow-up Request to 2.5× for Customer Waiting. Similarly, Fast Response brings a reward of 2×, but only when the response time is less than the 50th percentile of expected response times.

There may be stateful properties to the waiting logic. Fast Response detection that follows one of the negative modifiers such as Frustration or Customer Waiting allows support to claw back some of the previously incurred penalties. The results may simply be added so that the positive effects of responding quickly offset some of the negative effects of making the customer wait without 'forgetting' that the prior wait time had occurred.

Separately wait times across the case are considered such that repeatedly making a customer wait is penalized even more severely than any individual instance. This is done by sampling the response times over the course of the case and determining the probability of randomly 'drawing' those response times from the distribution. That is to say, a 95th percentile response time would only occur 5% of the time, but that still means 1 out of every 20 responses falls there. Two 95th percentile response times would occur 0.25% of the time, or in 1 out of every 400 cases. That is a significantly rarer event indicating that this case is on the extreme end as far as customer experiences go. Sentiment Score should be quite low in that case as a result and could see the score drop by as much as 25 points. This will usually be compounded by negative effects from the running wait time calculation above, such that a case could see as much as −37.5 points (25 from the cumulative wait times, 5*2.5 for 95th percentile wait+Customer Waiting detected) from waiting alone. The cumulative wait time effects, ranging from +15 to −25 points, may be determined by considering all of the wait times for the case and assigning them a bucket from known case patterns.

Figure 6:
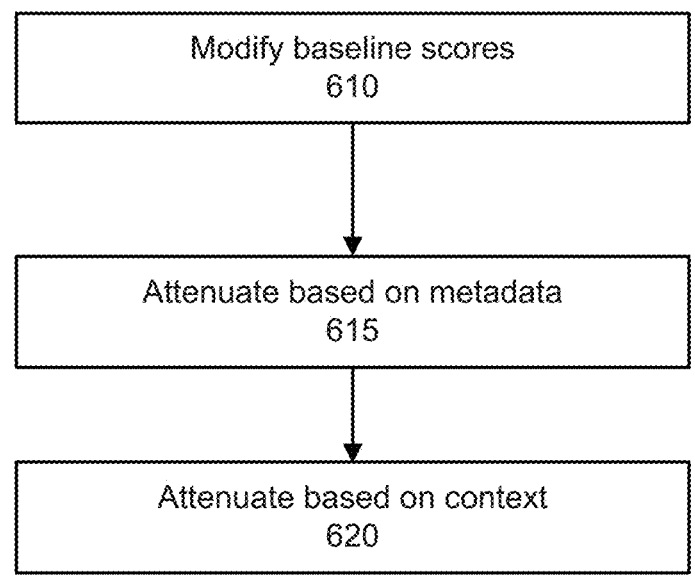
FIG. 6 shows a specific embodiment of a flow diagram for a method of using context and metadata to determine an overall sentiment for a communication based on scored features from the communication.

FIG. 6 shows a specific embodiment of a flow diagram for a method 600 showing how a model (such as models 560-566) may use context and metadata to determine an overall sentiment for a communication based on scored features from the communication, further elaborating on steps 230 and 235 of method 200. Method 600 may use a combination of weights to combine the individual feature scores into the final score (and/or combine the sub-scores into a final score). These weights may be predetermined as part of design of the second model, and the weights may vary for the same individual feature for inbound and outbound communication. For example, outbound Positive sentiments may have a lower native score contribution than inbound Positive sentiments. At step 610 the baseline scores are received by a scoring model (e.g. any of models 560-566). At step 615 the baseline scores may be attenuated (i.e. using predetermined weights) based on metadata. Metadata from the communication channels may influence the overall Sentiment Score (and may influences each individual 'categorical' score as well). Metadata includes information about the participants themselves (e.g., is this person an intern or Vice President?), the time of interactions (e.g., how long did the customer wait to receive an answer to their question?), and so on. In an exemplary embodiment, metadata attributes may be extracted and introduced as "features" into Sentiment Score. For example, a fast response to a question could have a positive effect on the score whereas a slow response could have a negative effect on Sentiment Score.

Additionally, in many instances, especially when customers are submitting their support requests via a CRM system, there are a wealth of informational fields completed by the customer and/or the support agent that are typically not introduced into the content of the communication. This additional metadata frequently includes request severity and customer support tier. This information can be used to "tune" the metadata scoring model appropriately for each specific interaction. For instance, if the customer support agent replies, "sorry for the delayed reply," but only minutes have elapsed since the customer message was received, this is an indication of excessive politeness and an apologetic tone and may be discounted by the first model. As a counterexample, if the customer does not apologize for a delayed response but their response is delayed, the score may be docked nonetheless due to the perception of a poor customer experience. ML models can be used to understand the urgency and severity of the customer's problem. While this doesn't necessarily indicate the sentiment of a customer, it can be used to better detect the perception and impact of delayed response from support i.e. a 4-hour response time for a minor issue is likely acceptable, whereas it is clearly not tolerable for a widespread production outage.

At step 620 the attenuated baseline scores are received and modified by the scoring models 550 based on context data. The context data may include context data for the communication content, as well as context data from prior context (e.g. related communications from the customer, similar communications from other customers, etc). In order to increase the accuracy and relevance of Sentiment Score, factors beyond the isolated scope of the communication and its associated metadata may be considered by the first model. These factors provide valuable information about the nature of the relationship between customers or individuals that may be used to augment the accuracy of identifying sentiment in text and increase the likelihood of determining the correct magnitude of that sentiment (and thus its effect on Sentiment Score). For example, a business may have a frequent customer who is typically quite civil, polite, and patient. If they respond kindly to a customer support agent, it is reasonable to assume that this is common behavior for that customer and the agent should not necessarily be credited for them acting that way. On the other hand, if they respond even the slightest bit brusquely to an agent, it may indicate that the agent has pushed the limits of their patience and their Sentiment Score should be docked accordingly (even if that language may be 'neutral', or without sentiment, for other individuals). This is an example of establishing baseline Sentiment Scores for customers: baselines may also be established as appropriate against products, agents, geographic regions, times of day, etc.

There are also contextual factors within a support case to consider when determining whether communication is sentimental (and how much). Many support organizations have more experienced or skilled support agents to which they turn when customers are most frustrated or need the most urgent help. If an organization employs a strategy in which they assign cases with the least happy customers to these support experts, any resulting positive sentiment should be given a stronger weight than a case in which an already happy customer remains happy. In other words, there may be "bonuses" of sorts within the Sentiment Score methodology through which credit is given for "saving" a case that has gone awry. Similarly, if a content or even happy customer suddenly becomes unhappy, those circumstances may merit a stronger subtraction from Sentiment Score than if the customer was already unhappy. Ultimately, contextual factors involving prior sentiment may include but are not limited to the lifetime accumulation of positive or negative sentiment to or from that customer, agent, or product, the type, severity and co-occurrence of that sentiment, and the order in which it occurred.

Finally, contextual factors entirely outside of the support domain may be considered for Sentiment Score for identified support experience features. These could include making the first model more sensitive to high-value customers in order to ensure management is kept abreast of any developments, or being more sensitive to different types of sentiment at different times in the duration of a customer contract. An example of the latter is being more attuned to product usability or training issues at the beginning of the contract in order to ensure the customer uses the product frequently before being more attuned to fast response times or indications that the customer could purchase additional products or licenses as the contract approaches a renewal period. Taking context from outside of the support domain ensures that Sentiment Score, particularly for a customer, is maximally aligned with business interests and increases its value throughout a business rather than confining its value to within a support organization.

Returning again to FIG. 2, the score values may be combined using a trained second model (such as model 590) to determine an overall sentiment of the filtered communication content at step 240. In addition to tallying individual score contributions from the identified support experience features, the second model may use context and/or metadata to perform further adjustments. For example, all of the wait time measurements described qualify as use of context during the scoring of individual features. The second model may access a service that exclusively calculates 'case metrics' such as the wait time between each comment, total wait time, number of participants in the case, etc., as well as tracking all of these metrics across time for each and every case. When it comes to calculating the wait time for a comment, prior comments and their respective metadata may be examined by the second model to determine how much time has actually been spent waiting.

For example, if a customer waits a day without receiving a response to their last question, they may send another email or message asking for an update. Once the support agent responds, wait time since the original request was made may be determined by the service, not since the most recent comment. This logic may be performed in both directions the time support has spent waiting on the customer may also be factored in. Wait times alone may also affect the score when they are outside the bounds of normal responses (compared with the historical distribution of response times) except in situations where an Out of Office message is indicated, in which wait times do not affect the score.

Furthermore, wait times may be considered together such that a customer that has been forced to wait extraordinary lengths multiple times will have the score docked more than the sum of each individual wait time penalty as a result of an extraordinarily poor customer experience. In this sense, the wait or response time for any customer comment may be considered context, but prior wait times from earlier in the case may also be considered additional context and are considered in addition to the most recent individual wait or response time. This may also be considered an example of context contributing directly to the score with an additional historical context element.

There are also ways in which prior sentiments detected via NLP affect the score contributions of newly detected language. Similar to how comment wait times affect the contribution of something like Customer Waiting (or conversely Fast Response) to the score, the prior detection of some events has damping or magnifying effects for new NLP events. For example, detecting Fast Response after Customer Waiting has somewhat of a canceling effect on the original negative contribution from Customer Waiting, but not as much as Fast Response detected without any prior negative wait events. In other words, just because an agent responded quickly after the customer became annoyed does not mean that the customer is no longer annoyed about having to wait previously and Sentiment Score should (and does) reflect that. To provide concrete numbers, if a Fast Response would contribute +3 to Sentiment Score on its own, after detection of Customer Waiting the same event may only generate a +1.5 (50% decrease) contribution.

There are similar effects for the current score. If Sentiment Score is high (>80) and the customer becomes Frustrated or otherwise exhibits negative sentiment, the contribution as a result of that detected negative sentiment will be greater than in a neutral or already low Sentiment Score case. The same is true of negative cases in which positive sentiments are detected. In both cases the score contributions are 150% of normal—so a negative sentiment that would contribute −5 to Sentiment Score contributes −7.5 if the score is very high at the time. This provides additional 'punishment' for cases in which an agent manages to annoy or frustrate someone who is already happy, and additional reward for cases in which someone in support manages to turn an unhappy customer around. The same process occurs for sentiments in the same direction—positive contributions are lessened when the case already has a high Sentiment Score, and negative contributions are lessened when the case has a low Sentiment Score. The baseline multiplier for this effect is 50% (multiplied by 0.5) but if the score is very close to 100 or 0, the multiplier will decrease to 25% (multiplied by 0.25). If the score still exceeds the range of 0 to 100 the score is capped to the most extreme allowable value. At any rate, this logic suggests that the prior context of the case—whether the customer is already happy or unhappy—affects the score contributions of newly detected NLP.

Figure 7:
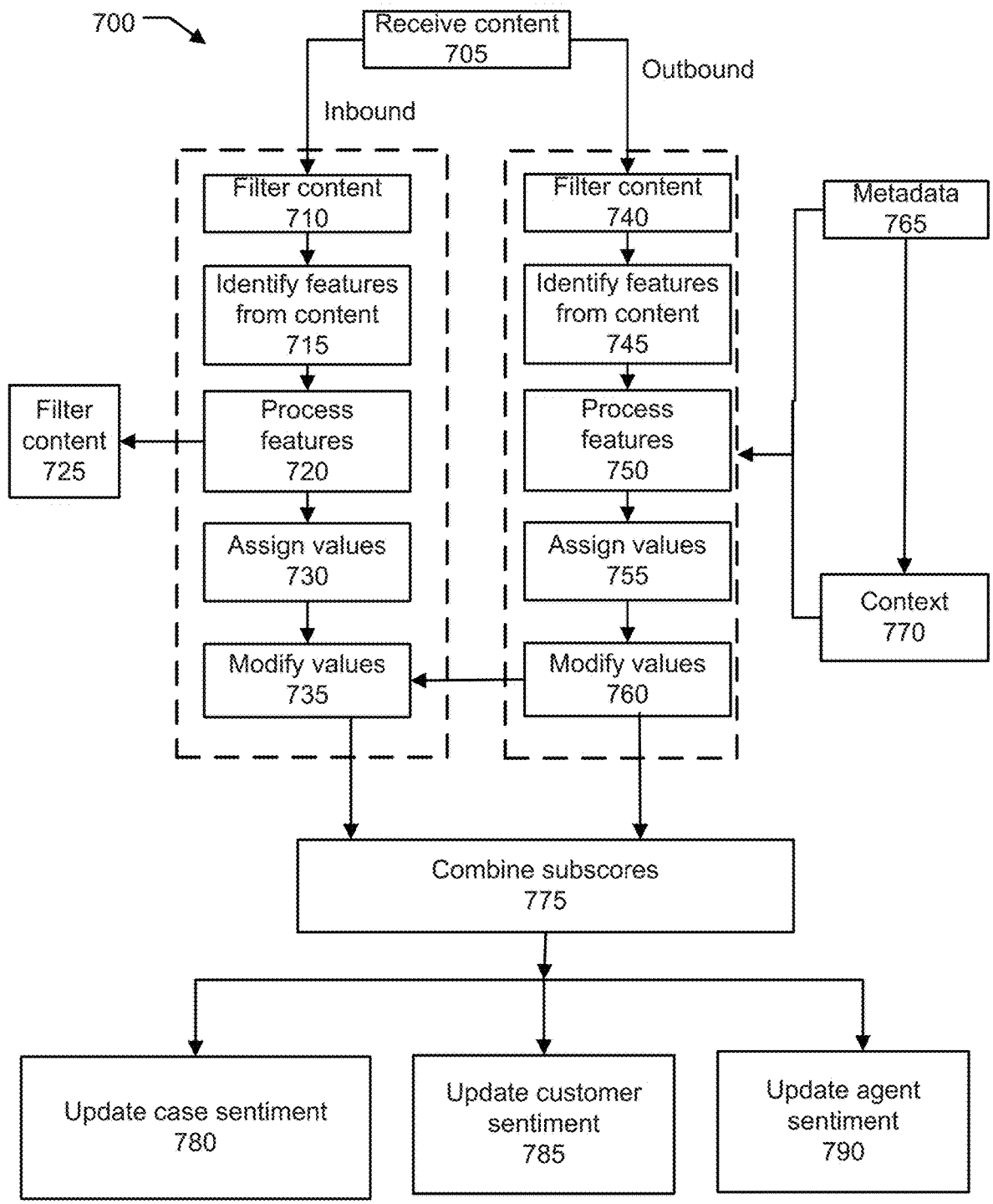
FIG. 7 shows a specific embodiment of a flow diagram for a method of determining sentiment using natural language processing in technical support communications.

Method 200 describes generating an overall sentiment score for an inbound communication. However, the present invention may be applied to outbound communications as well, singly or together in a series of communications with inbound communications. FIG. 7 shows a specific embodiment of a flow diagram for a method 700 of determining sentiment using natural language processing in technical support communications, and using the sentiment for longer-term tracking of sentiment with respect to various entities. The communication content, including inbound and outbound communications, may be analyzed using machine learning (ML) models that automatically detect the presence of sentiment and its associated polarity and strength. Analysis is not only performed on the inbound communication from the customer, but also the outbound communication from customer support; the tone and efficacy of a support agent greatly influences customer happiness. The inbound and outbound components are analyzed separately using models specifically tuned for inbound or outbound support communication. Every time a new interaction between the customer and the company occurs, the new interaction may be analyzed, sentiment detected and the Sentiment Score updated appropriately.

When the communication content is received and includes inbound and outbound communications between a customer device and an agent device, the two communication types are processed using different workflows. The inbound workflow, including steps 710, 715, 720, 730, and 735, is substantially the same as method 200, where sentiments relating to business entities (such as product or service sentiments) are filtered out at step 720 to be processed separately at step 725. The outbound workflow includes the steps of filtering the content at step 740 to remove technical support syntax (which may be a predetermined list of terms, as described above), identifying additional features from the filtered content at step 745, processing the additional features to improve technical support context at step 750 and assigning baseline values to the identified additional features at step 755 using a third model, and modifying a subset of the assigned scores at step 760. While these steps are performed substantially similarly to the inbound communication processing steps (described above in corresponding steps of method 200), a different third model is applied to the identified features to identify the polarities and strengths of the features. This third model has been trained to identify agent sentiments, as opposed to customer sentiments, which may be expressed in highly different terms from the customer sentiments. For example, all detected examples of "Fast Response" or "Helpful" sentiments from support agents are completely nullified. While polite, these do not meaningfully reflect the customer experience and as such may not be propagated to later steps in the scoring process.

Baseline scores of both the inbound and outbound communications of the series of communications may be modified based on at least one of the metadata 765 regarding the communications and the context data 770 relating to one or more of the customer and the agent, as described above. At step 775, the subscores of the inbound and the outbound communications may be combined for an overall sentiment score for the series of communications between the customer device and the agent device.

Additional analysis may be performed using the overall sentiment of the series of communications. For example, the overall sentiment may be combined with sentiments from past communications to update a case score (for the issue concerning the customer using the customer device), a customer score (for all issues the customer may have had), and/or an agent score for the agent handling the support case. By calculating and providing a comparable score across multiple dimensions, valuable insights may be provided to independent entities within an organization, with each insight being aligned to the needs of that particular entity. For example, management within a support organization may be interested in identifying particularly positive or negative isolated incidents of customer interaction, or may wish to identify their customer-facing agents whose customers have the best and worst support experiences. These needs differ widely from those of a salesperson or technical account manager who is most interested in aggregate values of the sentiment for their customers or accounts (rather than isolated incidents) in order to ensure their accounts remain in good standing. Those needs differ still from those of a product manager who would like the most accurate and up-to-date impression of customer feelings towards the product for which they are responsible rather than a customer-aligned view.

The overall sentiment for the communication content, which may be reflected in the sentiment score, may be used in a variety of ways. For example, sentiment score thresholds may be used, such that an alert (via e-mail, short message service (SMS), through an instant messaging or internet relay chat protocol, etc.) is sent to support personnel when the real-time score falls below the thresholds. In other embodiments, plots, dashboards and reports that show change in sentiment score over time may be generated based on the sentiment score, or various sub-scores incorporated into the sentiment score. Examples of such visualizations may be seen in FIGS. 8-11, discussed below.

Figure 8:
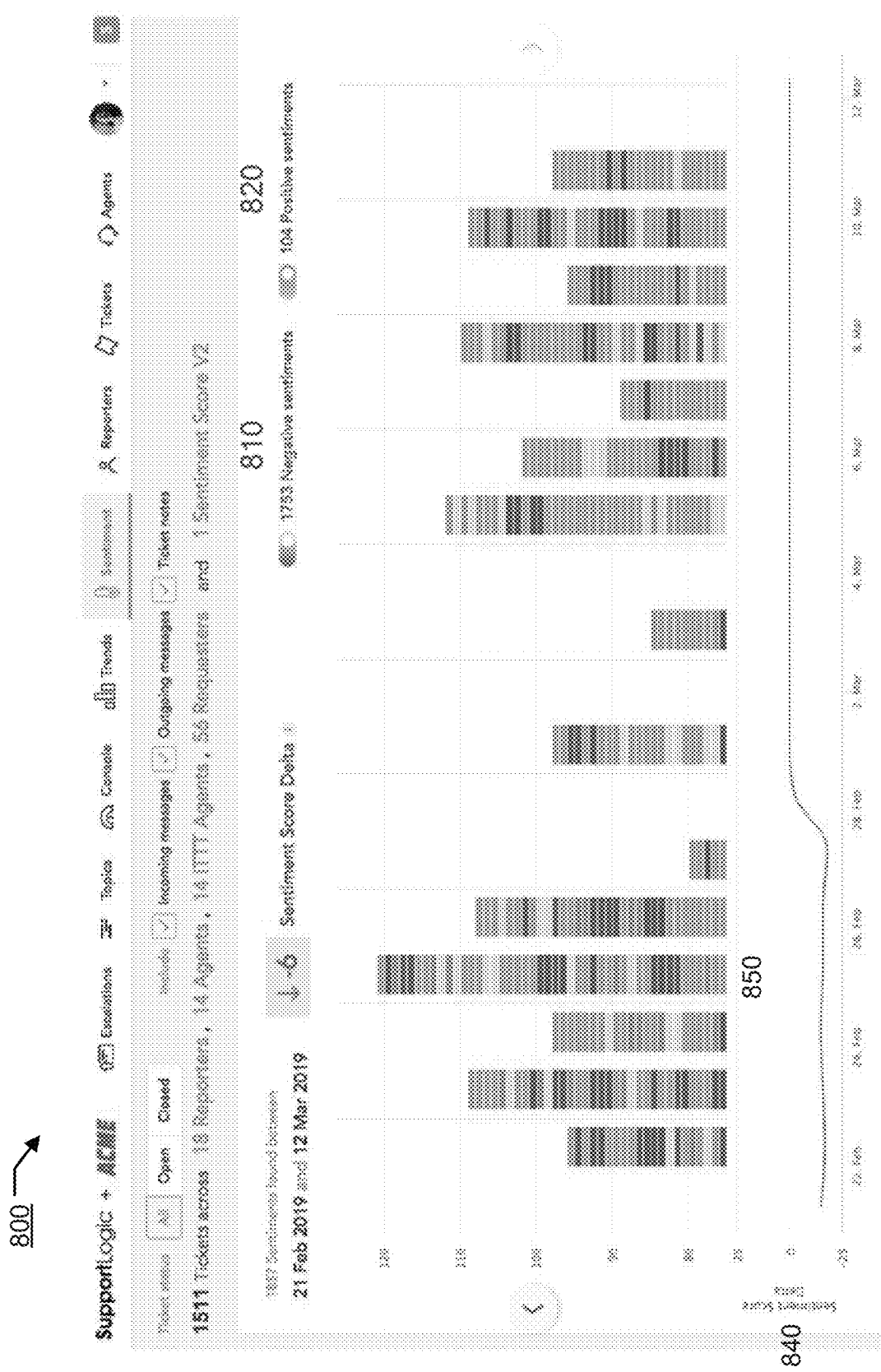
FIG. 8 is a screenshot illustrating a distribution of sentiment for various entities over a period of time according to an embodiment.

FIG. 8 is a screenshot 800 illustrating a distribution of sentiment for various entities over a period of time according to an embodiment. Display 800 shows an organization-wide view of the sentiment scores for all technical support cases, which may be a useful metric to track overall performance. Included in the display 800 are individual summaries of positive sentiments 810 and negative sentiments 820. The sentiments may be included in chronologically-based columns, such as column 850, with neutral language (i.e. text from communications where no sentiment has been identified by the first model). Also shown in display 800 is a sentiment score delta 840, showing difference between positive and negative sentiments, over a predetermined period of time.

Figure 9:
FIG. 9 is a screenshot illustrating a distribution of sentiment for a customer over an adjustable period of time according to an embodiment.

FIG. 9 is a screenshot 900 illustrating a distribution of sentiment for a customer 910 over an adjustable period of time according to an embodiment. Similar to screenshot 800, display 900 shows aggregate positive and negative sentiments 920 and 930 respectively over a period of time. Other visualizations in screenshot 900 are graphic 950, illustrating number of tickets meeting a response time criteria, and bar graph 960 illustrating the subject matter of received tickets during the period of time in question. The same fundamental contributors to the case Sentiment Score are present in the statistical model for generating Sentiment Score for a given customer, but which exact features are used and the way in which they contribute to the score are different. In other words, Sentiment Score of entire support cases opened by a customer may be used as an input to customer Sentiment Score, but the calculated sentiment of a single piece of communication from a case may also be considered as an independent input. These may be done in concert, retaining the value derived from the narrative-oriented metric of case Sentiment Score while also supplementing it with knowledge beyond the scope of any one case.

For example, the system could look at all inbound comments from a customer for a given day (even if they are spread across multiple cases) in order to determine the sentiment of the relationship on that day regardless of the timing of the cases in which they occurred. The same form of higher-scope analysis may be done for an individual; i.e., group inbound communications by the individuals from whence they came (without regard for in which case they occurred), potentially also combined with time-oriented analysis as in the previous example. These groups of communication may be treated as input alongside metadata about those individuals, such as their role within an organization or their sway in purchasing decisions for company products, in order to derive a score contributor for that individual. Such analysis assures that customer Sentiment Score is aligned with the business interests of the parties that may consume it as a metric in order to make data-driven business decisions.

There are also unique factors for customer Sentiment Score including but not limited to the attenuation of scores from interactions in the more distant past relative to those that occurred more recently. It is reasonable to assume that a single negative support case that closed years ago is less relevant to a customer that is deciding whether to renew a product license than the positive cases they experienced within the past week or month. Furthermore, supplemental information about the importance or severity of each case may also be taken into account so that highly critical or important issues have greater effect on the Sentiment Score of a customer than minor issues such as reporting a typo in a software dialog box. Importance or severity of a case may be derived from case metadata, where available, but a scoring methodology similar to Sentiment Score may be used that determines the severity and/or urgency of a case using machine learning models. The output of this "Need Attention Score" may be used as an input to customer Sentiment Score in order to achieve this weighting against problem importance.

Once a score has been determined for a customer, there are many uses for this metric within a company, both inside and out of the support organization. Sentiment Score may be combined with data from other company sources in order to maximize business value. For example, if it is combined with a sales system of record that tracks account managers and responsible salespersons, those individuals may be notified in real time of notable changes in their customers' sentiments. Positive changes may indicate periods of sales opportunities, whereas negative changes may require discounts or proactive relationship management in order to maintain a productive business relationship. This information may also flow in the other direction back into the support organization so that support leadership could be informed to keep a close eye on cases from high-value customers whose Sentiment Scores deviate from the norm, or to ensure that Sentiment Score of customers in a contract renewal period are closely monitored.

It is likely that a customer who experiences repeated or continual disappointments in product features, performance, or service will look elsewhere for solutions to their problems and needs. Salespeople take pride in their ability to infer the way a customer feels about their company or product(s), typically using interpersonal skills to do so. Unfortunately for those salespeople, they may have little visibility into, knowledge of, or ability to comprehend technical issues that arise from product usage. Customer Sentiment Score provides them an opportunity to pair their interpersonal skills and sales knowledge with data derived directly from their company's support engagements without investing significant personal time into reading support cases themselves. This is essential for salespeople of a wide variety of or particularly complicated technical products, whose purchasers may open support cases with too much depth or breadth to be understood by a salesperson in a reasonable amount of time.

Customer Sentiment Score also provides value within the support domain. It is common for support agents to look up tickets previously opened by a customer in order to get an impression of the state of their relationship (e.g., to check if this issue is isolated or part of a larger pattern). This is a time-consuming (and thus expensive) operation and precludes an agent's ability to respond quickly and effectively. Customer Score may be integrated into support products so that immediately upon a support case being opened, anyone with the ability to view that case is able to get a near-instantaneous understanding of the state of the relationship and is able to quickly view the circumstances that contributed to that score, e.g., a recent case in which their sentiment was particularly positive or negative.

Figure 10:
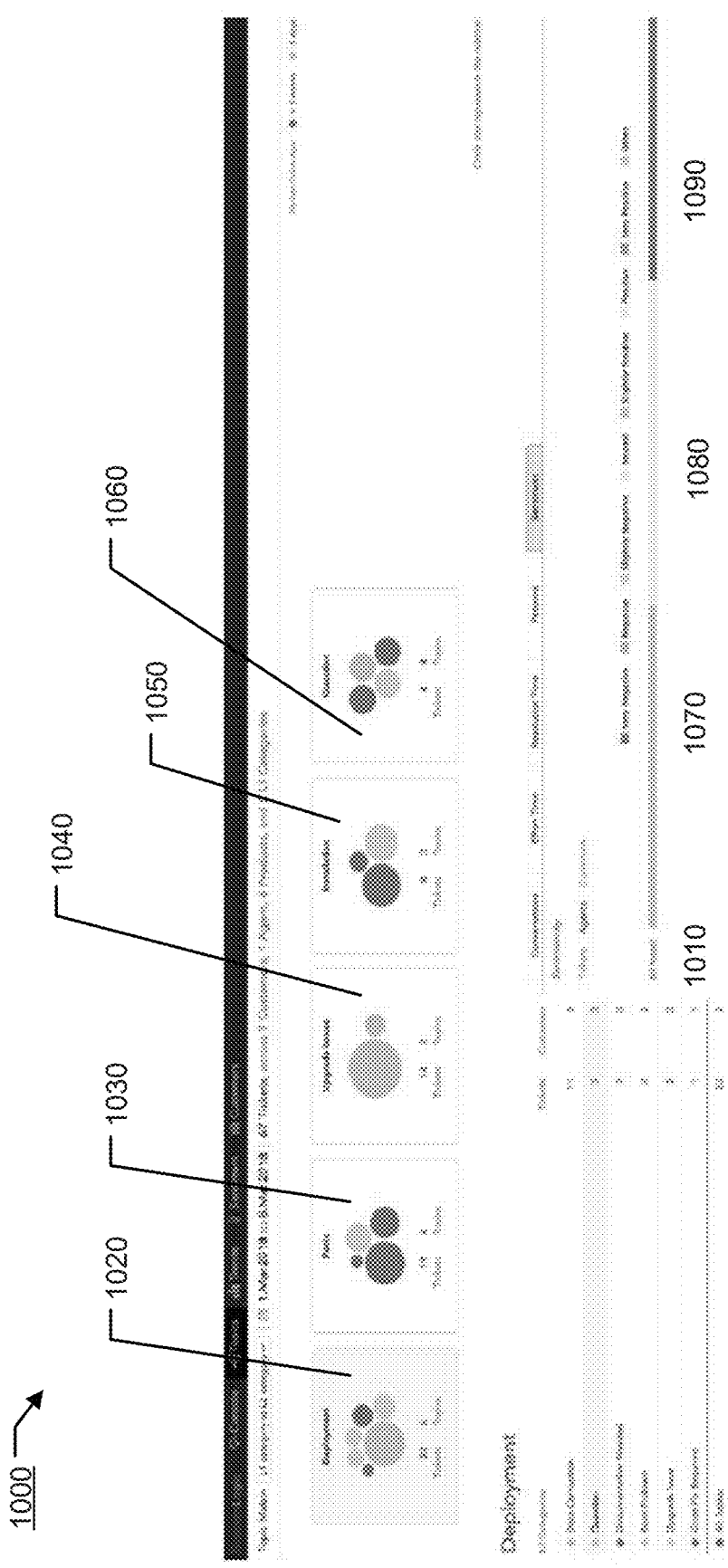
FIG. 10 is a screenshot illustrating a distribution of sentiment for an agent over an adjustable period of time according to an embodiment.

Sentiment Score can also be determined for specific employees or individuals, with support agents being of particular interest to support organizations. FIG. 10 is a screenshot 1000 illustrating a distribution of sentiment for an agent 1010 over an adjustable period of time according to an embodiment. Unlike screenshots 800 and 900, the agent display 1000 includes more granular data regarding a variety of cases. For example, numbers of support tickets for deployment 1020, panic 1030, upgrade issues 1040, installation 1050, and general questions 1060 are provided, allowing a business to identify what areas are requiring more support. The agent's sentiment score totals are also displayed in screenshot 1000, including positive 1070, neutral 1080, and negative 1090 communication totals over the selected period of time.

An advantage of method 700 is that entity detection may be used together with context and metadata to attribute changes in sentiment to individual agents. An example of the use of Context when determining Agent Score is when an inbound communication arrives in a rotated case, the originating individual of the most recent outbound communication may be used to infer who the customer may intend to communicate with. The salutation ("Hello <name>,") may be used as a Content factor, or the time of day of the inbound communication as a Metadata factor in order to most accurately attribute the inbound sentiment to the appropriate support agent. To maximize the relevance of the derived metric to a business we also take into account different aspects of sentiment when calculating Agent Score. For Agent Score, personal or soft skill aspects such as civility contribute more to the final score than the product aspect. In the case of the product aspect, we do not want support agents to feel discouraged from tackling difficult problems in order to keep their Agent Score high, and some agents may specialize in products that are less robust than others, unfairly punishing them for circumstances out of their control. By increasing aspects within their control such as soft skills and timeliness, agents who wish to maximize their score, consciously or unconsciously, are able to do so while also ensuring that remediating actions they may take are aligned with their purpose within a business, increasing organizational alignment and efficiency simultaneously.

Agent Score presents novel value to a business in the form of improved customer relationships through identification of its top performing agents who exhibit model behavior (and are pleased to be recognized) and poor performing agents who may be trained up to improve overall customer satisfaction. It simultaneously provides greater efficiency to a support organization by providing instantaneous feedback for this customer-facing behavior alongside greater accountability and visibility, obviating investment in post-hoc case analysis and ineffective, broadly applied training for agents that may not need it. In summary, Agent Score provides opportunities for increased business revenue as a result of improved relationships while also lowering the cost of initiatives designed to improve those same relationships.

Figure 11:
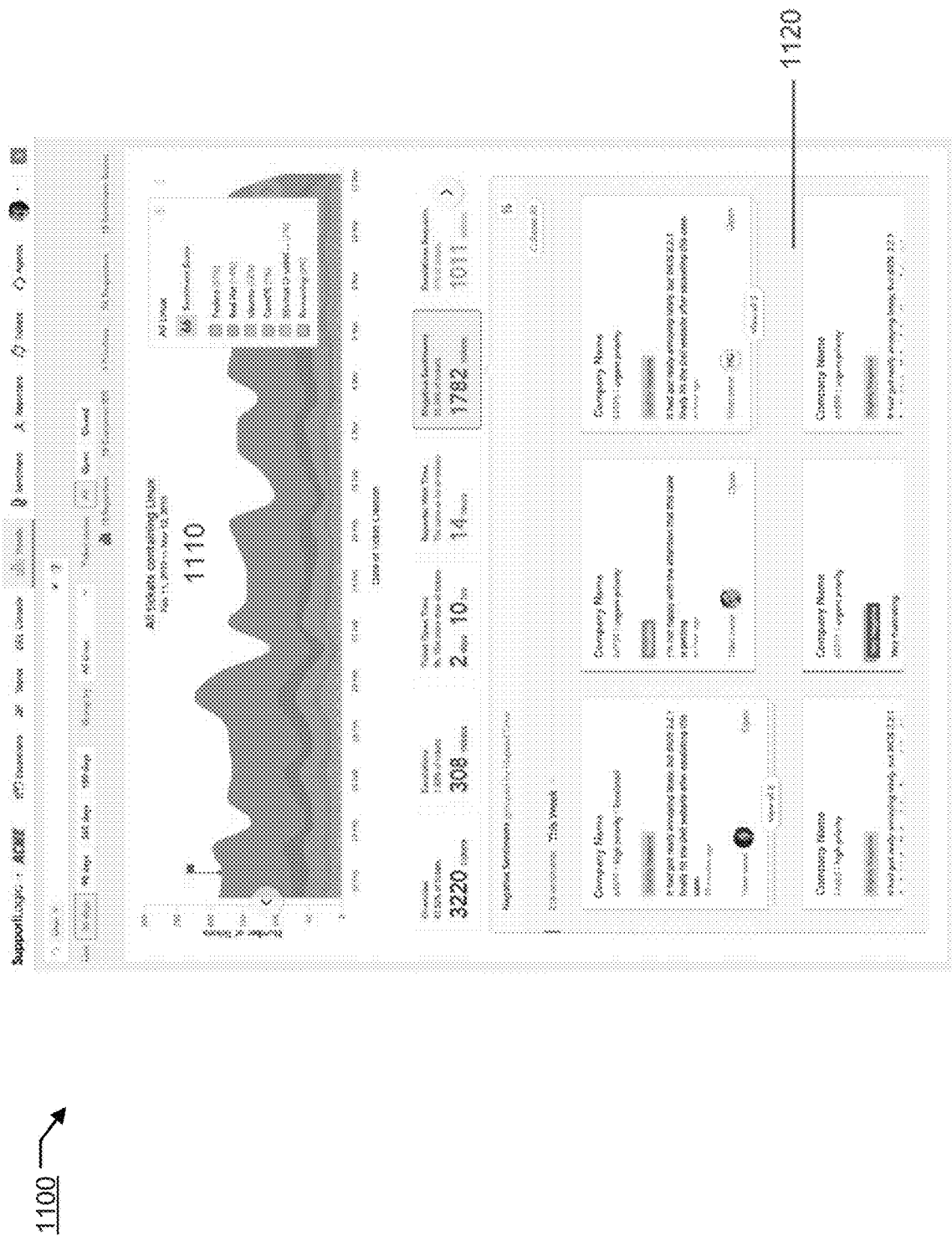
FIG. 11 is a screenshot illustrating a sentiment breakdown by ticket keywords over an adjustable period of time according to an embodiment.

FIG. 11 is a screenshot 1100 illustrating customer sentiments filtered by one or more selectable ticket entries and over an adjustable period of time according to an embodiment. In the exemplary embodiment, a keyword search has been performed for the term "Linux" in all tickets, and a graphical display showing highlighting ticket and ticket entity volume trends 1110 has been displayed in response to the search. Screenshot 1100 also includes selected features from individual contributions in region 1120. These selected features, for example, may be the features having the greatest positive or negative contribution to the sentiment score for associated communications, based on the underlying sentiment.

As mentioned above, product sentiments may be analyzed separately from support experience sentiments (e.g., at step 725 of method 700). Many businesses sell more than one product or service (for brevity, we will simply use the term "business experiences" to describe any good or service sold), and even those that sell only one sell more than one version of that sole product. It can be difficult for a business to determine how customers perceive that product. Often, business initiatives designed to discover customer sentiment of a product are expensive field surveys that suffer the same potential for bias as support case surveys and reach only a select few customers, which leaves room for additional selection bias. In order to save cost, businesses may wait until trade conferences to canvas customers, further lengthening the gap between product development and real-world product feedback, increasing the probability that the company will invest in undesired or ineffective product changes for a longer period of time. A Product Score may be used to provide targeted, real-time feedback directly from customers to the relevant product development teams within a business, increasing their ability to make investments in the areas most important to paying customers in a timely fashion. Not only does this reduce the cost of acquiring customer feedback, Product Score also reduces the cost of misplaced product initiatives by providing real-world insight to product teams much more quickly than they could otherwise acquire it.

To determine a product score, the aforementioned techniques of extracting sentiment as the other dimensional methods as previously outlined may be used, but with a particular focus on the customer experience with a product. The same sentiment aspects may be extracted as before, but whereas for sentiment score the emphasis was placed on the support experience, Product Score focuses on customers' ability to productively use a product or service. This entails discovery of how essential a product is to a customer, how easy that product is to use, and how it may encounter failure states that adversely affect a customer's ability to achieve its goals. By extracting these sentiment aspects independently, a nuanced view of a product's success may be provided directly from real-world use cases so that product teams can make the most informed decisions about how their product is currently used and how it can be improved for future use. For example, depending on the industry, some products may be more focused on functionality or criticality of the product whereas others may be focused on the positivity of customer experience. This nuanced view of customer experience is difficult to achieve by conventional means and is even more difficult (and sometimes impossible, given organizational gaps) to glean in real-time.

Circling back, when a business canvasses a customer for product feedback it may be difficult for the respondents to properly isolate their feelings towards one product or another in a way that is actionable for product development teams within that business. For example, if a business sells two products, about one a customer feels very positively and about the other they feel very negatively, the customer may simply respond that they are in the middle on both. This may be out of convenience or due to the human tendency to forget the intricacies of their interactions when faced with such a choice at a later date. Regardless, if the business were to take such feedback and invest equally in improving both products, some investment will be wasted on the diminishing returns of the effective product and the ineffective product will receive insufficient improvements, leading to suboptimal outcomes on both sides. The automated, targeted sentiment scoring of Product Score provides the same business more accurate reports for both products, ensuring both receive the appropriate investment for their growth needs, leading to better outcomes both on the balance sheet and in the products themselves.

Finally, because Product Score may be associated with exact, specific versions of a product, a company finally has precise, real-time data as to which product versions are most effective and enjoyed by customers. If a business releases four versions of a software product a year, an annual customer survey will make it difficult for it to discover exactly which of the four versions performed better or worse against customer expectations. This does not even account for a situation when a customer could still be using any number of versions of that software released before that calendar year. In any case, Product Score provides a precise accounting of the customer sentiment towards exact product versions across time, allowing a business to more accurately determine how its products change over time, increasing their ability to make more intelligent investments into R&D while at the same time increasing the quality of their products across the board.

The sentiment assessment determination procedures described above may be performed automatically and in near-real-time through automated analysis of business interactions with its customers, potentially through an integration with their Customer Relationship Management (CRM) software/service. In addition to the above-described features, users (with appropriate administrator privileges) can manually provide feedback and override the sentiment predictions made by the ML models. This feedback not only immediately influences the computed score, but can be leveraged to iteratively improve the accuracy of the ML models, ensuring that the accuracy of the score improves as time progresses.

Furthermore, the computed score can be used to generate automated alerts to inform support agents (or their managers) that remediation is required e.g. if the sentiment falls too low, or even if a high sentiment starts to drop precipitately. The sentiment scoring system is dynamic and can be recomputed from the raw data source, allowing the system to get better and increasingly sophisticated with time.

Beyond the applications of the Sentiment Score already discussed, the sentiment assessment determination procedures can be used to drive a wide variety of other actions and decisions across a company. For example, sentiments derived from communication content may be used to track, measure and improve performance of support operations (e.g., to identify which support center/region is performing better compared to the other, which agent has consistently better performance over others, etc.). Customer sentiment data may also be used to train agents to improve their soft skills, to track product satisfaction and improve product usability and feature sets, to send contextual alerts—in technical support customers are always unhappy but some unhappy conversations are more noteworthy than the other, and to track progress of a support ticket and alert the right people if the sentiment score gets progressively worse. Additionally, sentiment score from individual tickets and customer sentiment score may be combined to determine if a case needs to be escalated, to match agents with customer based on sentiment score, and to predict customer churn.

Figure 12:
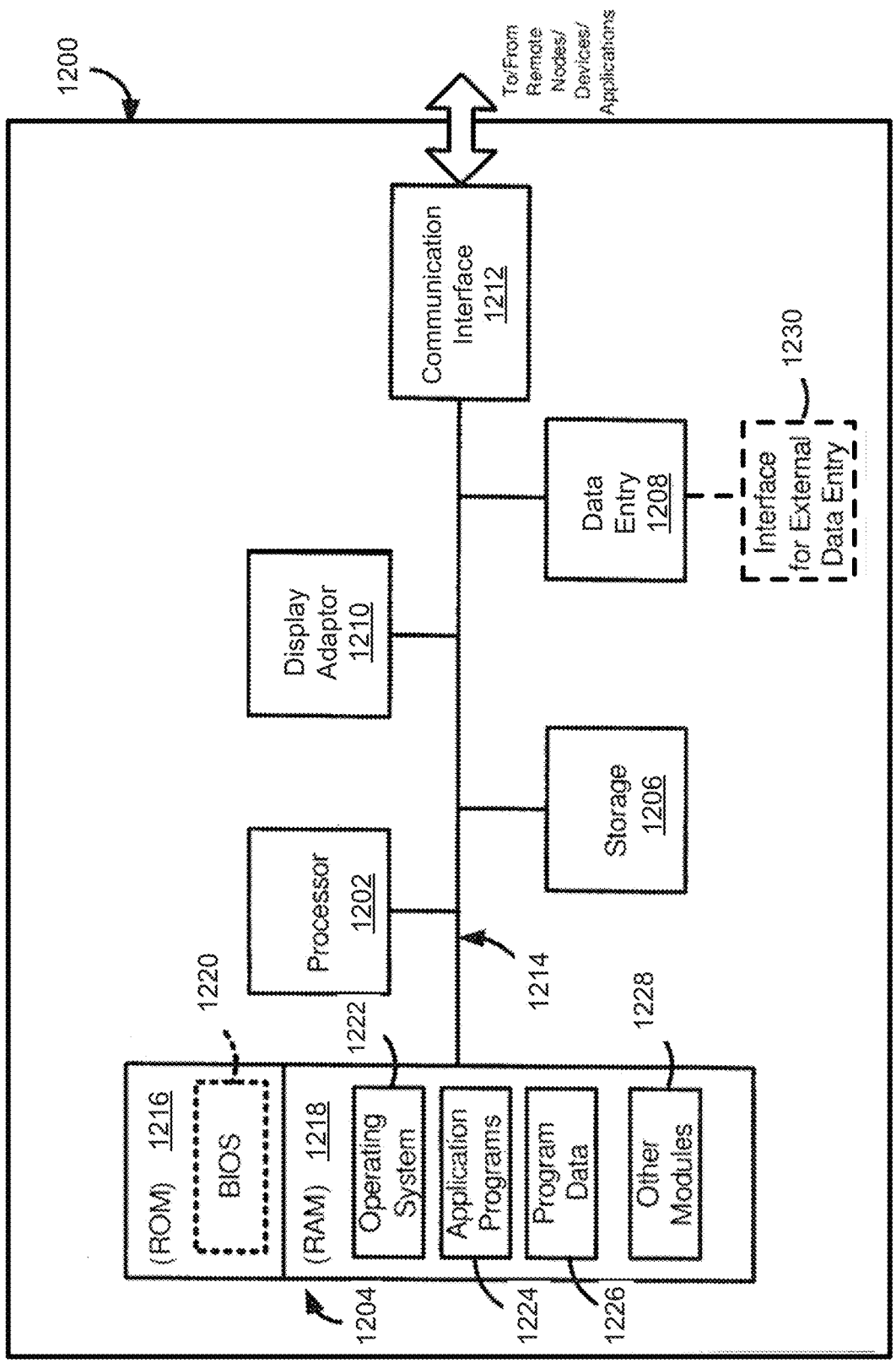
FIG. 12 depicts a block diagram illustrating an exemplary computing system for execution of the operations comprising various embodiments of the disclosure.

FIG. 12 is a block diagram of an exemplary system used to automatically determine sentiment with regard to communications in the technical support context (such as customer device 110, agent device 124, or any devices used to implement system 120). With reference to FIG. 12, an exemplary system for implementing the subject matter disclosed herein, including the methods described above, includes a hardware device 1200, including a processing unit 1202, memory 1204, storage 1206, data entry module 1208, display adapter 1210, communication interface 1212, and a bus 1214 that couples elements 1204-1212 to the processing unit 1202.

The bus 1214 may comprise any type of bus architecture. Examples include a memory bus, a peripheral bus, a local bus, etc. The processing unit 1202 is an instruction execution machine, apparatus, or device and may comprise a microprocessor, a digital signal processor, a graphics processing unit, an application specific integrated circuit (ASIC), a field programmable gate array (FPGA), etc. The processing unit 1202 may be configured to execute program instructions stored in memory 1204 and/or storage 1206 and/or received via data entry module 1208.

The memory 1204 may include read only memory (ROM) 1216 and random access memory (RAM) 1218. Memory 1204 may be configured to store program instructions and data during operation of device 1200. In various embodiments, memory 1204 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1204 may also include nonvolatile memory technologies such as nonvolatile flash RAM (NVRAM) or ROM. In some embodiments, it is contemplated that memory 1204 may include a combination of technologies such as the foregoing, as well as other technologies not specifically mentioned. When the subject matter is implemented in a computer system, a basic input/output system (BIOS) 1220, containing the basic routines that help to transfer information between elements within the computer system, such as during start-up, is stored in ROM 1216.

The storage 1206 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1200.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment.

As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1206, ROM 1216 or RAM 1218, including an operating system 1222, one or more applications programs 1224, program data 1226, and other program modules 1228. A user may enter commands and information into the hardware device 1200 through data entry module 1208. Data entry module 1208 may include mechanisms such as a keyboard, a touch screen, a pointing device, etc. Other external input devices (not shown) are connected to the hardware device 1200 via external data entry interface 1230. By way of example and not limitation, external input devices may include a microphone, joystick, game pad, satellite dish, scanner, or the like. In some embodiments, external input devices may include video or audio input devices such as a video camera, a still camera, etc. Data entry module 1208 may be configured to receive input from one or more users of device 1200 and to deliver such input to processing unit 1202 and/or memory 1204 via bus 1214.

The hardware device 1200 may operate in a networked environment using logical connections to one or more remote nodes (not shown) via communication interface 1212. The remote node may be another computer, a server, a router, a peer device or other common network node, and typically includes many or all of the elements described above relative to the hardware device 1200. The communication interface 1212 may interface with a wireless network and/or a wired network. Examples of wireless networks include, for example, a BLUETOOTH network, a wireless personal area network, a wireless 802.12 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1212 may include logic configured to support direct memory access (DMA) transfers between memory 1204 and other devices.

In a networked environment, program modules depicted relative to the hardware device 1200, or portions thereof, may be stored in a remote storage device, such as, for example, on a server. It will be appreciated that other hardware and/or software to establish a communications link between the hardware device 1200 and other devices may be used.

It should be understood that the arrangement of hardware device 1200 illustrated in FIG. 12 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1200.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 12.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

The subject matter has been described herein with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description herein, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of a preferred embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:
    receiving, by a processor of a computer having memory, communication content exchanged between a customer device and an agent device, the communication content comprising inbound communication to the agent device;
    filtering, by the processor, the received communication content to remove predetermined technical support syntax;
    assigning, by the processor, baseline values to features within the filtered communication content, the assigning comprising:
        identifying the features from the filtered communication content, the features pertaining to expressed sentiments in the filtered communication content;
        applying a first machine-learning model, which is trained for entity detection, to classify each identified feature as relating to one of a product support experience and a product experience;

applying the first machine-learning model, which is trained to identify polarities and strengths related to identified features, to each product support experience identified feature; and assigning a score value to each identified product support experience feature using a plurality of scoring models, the score values being based on the polarities and strengths identified for each product support experience identified feature;

weighting, by the processor, a subset of the score values based on metadata associated with the filtered communication content; and combining the score values using a second machine-learning model, which is trained to use weighted combinations to determine an overall sentiment of the filtered communication content.

2. The method of claim 1, further comprising weighting, by the processor, a second subset of the score values based on a persona value associated with one of the customer and the agent, the persona value based on historical data for the one of the customer and agent in technical support.

3. The method of claim 1, further comprising using the overall sentiment to update a case score.

4. The method of claim 1, further comprising using the overall sentiment to update a customer score.

5. The method of claim 1, further comprising using the overall sentiment to update an agent score.

6. The method of claim 1, the communication content further comprising outbound communication from the agent device to the customer device, the method further comprising:

identifying, by the processor, additional features from the outbound communication, the features pertaining to expressed sentiments in the filtered communication content;

applying a trained third machine-learning model to each identified additional feature to identify polarities and strengths related to the identified additional features, the third machine-learning model being trained to identify agent sentiments;

assigning, by the processor, a score value to each identified additional feature, the score values being based on the polarities and strengths identified for each identified additional feature; and weighting, by the processor, a subset of the score values of the identified additional features based on metadata associated with the outbound communication, wherein the overall sentiment is combined with the weighed score values of the identified additional features to generate a sentiment for communication content.

7. The method of claim 1, wherein context data is used to identify the polarities and the strengths related to the identified features.

8. The method of claim 7, wherein the context data is further used to weight the subset of the score values.

9. The method of claim 1, the filtering comprising removing a predetermined list of technical jargon with potentially negative interpretation.

10. The method of claim 1, the identifying the features being performed using natural language processing techniques that include one or more of tokenization, n-gram creation, TF-IDF, and one-hot encoding.

11. The method of claim 1, the communication content comprising a series of communications between the customer device and the agent device, the assigning the score values by the plurality of scoring models comprising:

assigning baseline scores for each identified product support experience feature based on the polarity and strength of the identified feature;

modifying the baseline scores based on accumulation, order, cadence, and spread of sentiment within the inbound communication;

attenuating the modified baseline scores a first time based on metadata related to the series of communications; and attenuating the modified baseline scores a second time based on context data relating to at least one of the agent and the customer.

12. The method of claim 1, wherein identified product experience features are used to determine a product sentiment.

13. The method of claim 1, wherein the overall sentiment is used to determine a real-time support sentiment that is updated when subsequent communications between the customer device and the agent device are received.

14. The method of claim 13, further comprising generating an alert to inform a support agent that remediation is needed in response to the overall sentiment falling to a predetermined threshold.

15. The method of claim 1, further comprising providing, by the agent device, a graphical interface displaying changes in the overall sentiment over a predetermined period of time.

16. The method of claim 1, where the communication content relates to information technology tickets.

17. The method of claim 1, where the communication content relates to engineering tickets.

18. A computer program product comprising a non-transitory computer-readable medium having computer-readable program code embodied therein to be executed by one or more processors, the program code including instructions to:

receive communication content exchanged between a customer device and an agent device, the communication content comprising inbound communication to the agent device;

filter the received communication content to remove predetermined technical support syntax;

assign baseline values to features within the filtered communication content, the assigning comprising:

identifying the features from the filtered communication content, the features pertaining to expressed sentiments in the filtered communication content;

applying a first machine-learning model, which is trained for entity detection to classify each identified feature as relating to one of a product support experience and a product experience;

applying the first machine-learning model, which is trained to identify polarities and strengths related to identified features, to each product support experience identified feature; and assigning, by the processor, a score value to each identified product support experience feature, the score values being based on the polarities and strengths identified for each product support experience identified feature;

weight a subset of the score values based on metadata associated with the filtered communication content; and combine the score values using a second machine-learning model, which is trained to use weighted combinations to determine an overall sentiment of the filtered communication content.

19. The computer program product of claim 18, the communication content further comprising outbound communication from the agent device to the customer device, the computer program product further comprising instructions to:
- identify additional features from the outbound communication, the features pertaining to expressed sentiments in the filtered communication content;
- apply a trained third machine-learning model to each identified additional feature to identify polarities and strengths related to the identified additional features, the third machine-learning model being trained to identify agent sentiments;
- assign a score value to each identified additional feature, the score values being based on the polarities and strengths identified for each identified additional feature; and
- weight a subset of the score values of the identified additional features based on metadata associated with the outbound communication, wherein the overall sentiment is combined with the weighed score values of the identified additional features to generate a sentiment for communication content.

20. The computer program product of claim 18, wherein context data is used to identify the polarities and the strengths related to the identified features.

* * * * *